(12) United States Patent
Bayley

(10) Patent No.: US 6,464,246 B2
(45) Date of Patent: *Oct. 15, 2002

(54) VEHICLE OCCUPANT LOWER EXTREMITY PROTECTION APPARATUS

(75) Inventor: Gregory S. Bayley, Dryden, MI (US)

(73) Assignee: TRW Vehicle Safety Systems Inc., Lyndhurst, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

(21) Appl. No.: 09/290,568

(22) Filed: Apr. 13, 1999

(65) Prior Publication Data

US 2001/0017454 A1 Aug. 30, 2001

(51) Int. Cl.[7] ................................................ B60R 21/16
(52) U.S. Cl. ................ 280/728.1; 280/730.1; 280/728.2; 280/753
(58) Field of Search .................... 280/730.1, 728.1, 280/753, 743.2, 728.2

(56) References Cited

U.S. PATENT DOCUMENTS

| | | | | |
|---|---|---|---|---|
| 3,981,518 A | * | 9/1976 | Pulling | 280/730 |
| 4,099,743 A | * | 7/1978 | Non | 280/753 |
| 5,409,260 A | * | 4/1995 | Reuber et al. | 280/753 |
| 5,513,877 A | * | 5/1996 | Mac Brien et al. | 280/743.2 |
| 5,718,448 A | * | 2/1998 | Knoll | 280/753 |
| 5,762,367 A | * | 6/1998 | Wolanin | 280/743.2 |
| 5,765,867 A | * | 6/1998 | French | 280/743.2 |
| 5,797,620 A | * | 8/1998 | Eyrainer | 280/730.1 |

FOREIGN PATENT DOCUMENTS

| | | | | |
|---|---|---|---|---|
| DE | 19735915 | * | 3/1998 | B60R/21/02 |
| EP | 0684164 | * | 11/1995 | B60R/21/02 |

* cited by examiner

Primary Examiner—Brian L. Johnson
Assistant Examiner—J. Allen Shriver
(74) Attorney, Agent, or Firm—Tarolli, Sundheim, Covell, Tummino & Szabo L.L.P.

(57) ABSTRACT

An apparatus (12) for helping to protect an occupant of a vehicle (10) comprises an inflatable device (40) having a stored deflated position in which the inflatable device is located adjacent an instrument panel (14) in the vehicle. An inflator (70) provides inflation fluid for inflating the inflatable device (40). The inflatable device (40), when inflated, engages a lower extremity (18) of the occupant. An actuator (80) moves the inflatable device (40) rearwardly in the vehicle (10) to move a foot (20) associated with the lower extremity (18) of the occupant rearwardly in the vehicle.

34 Claims, 2 Drawing Sheets

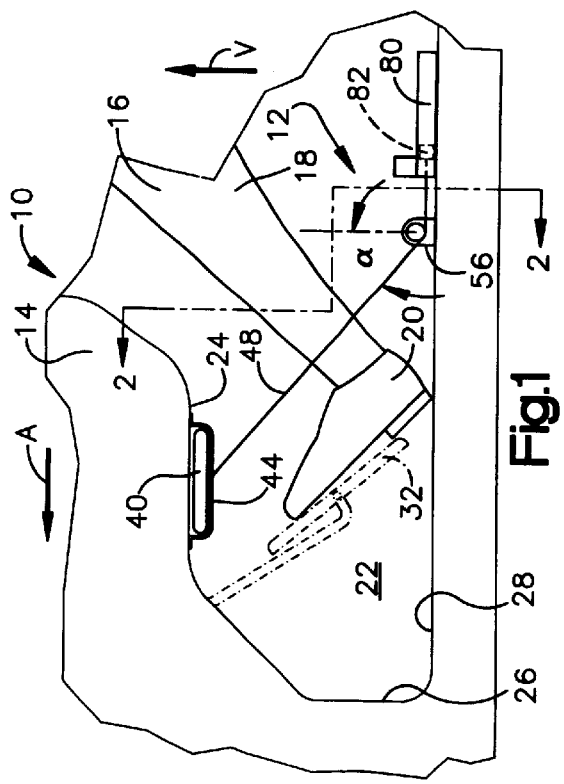
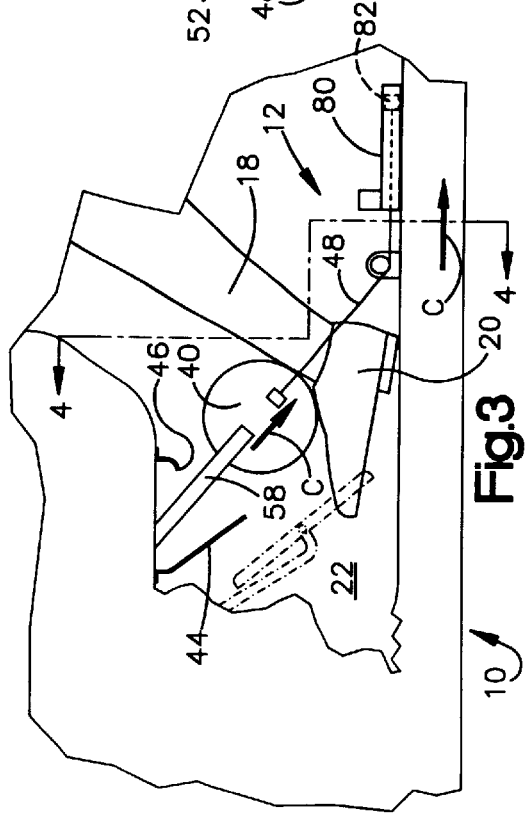
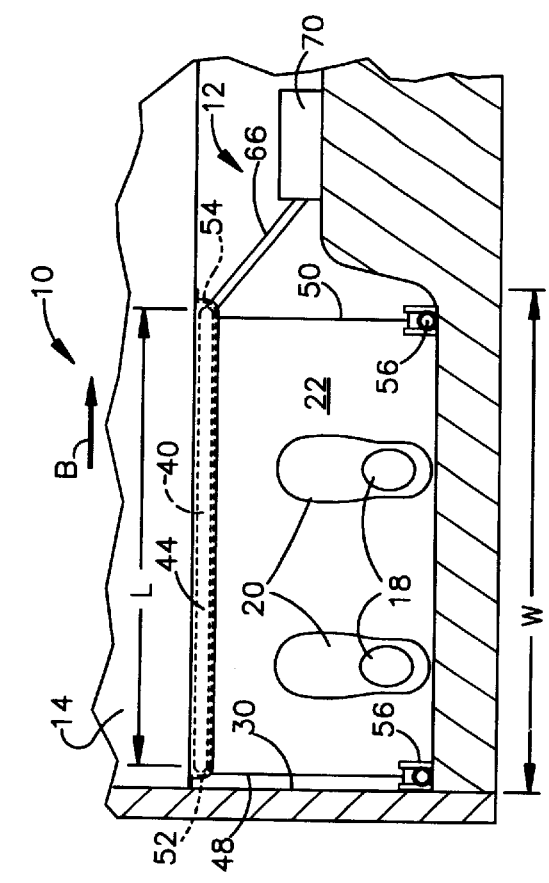
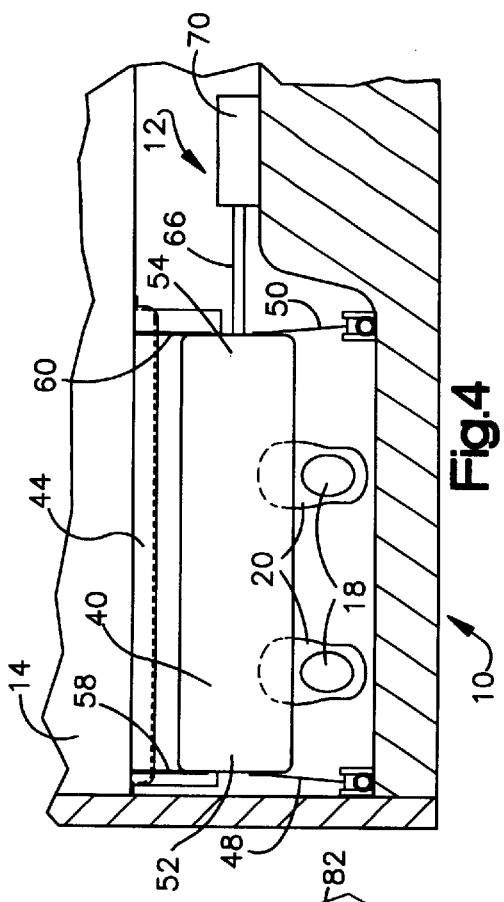

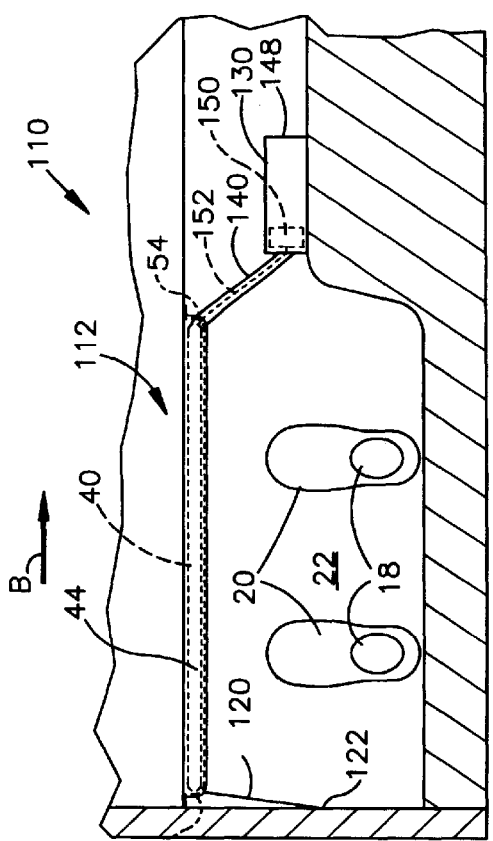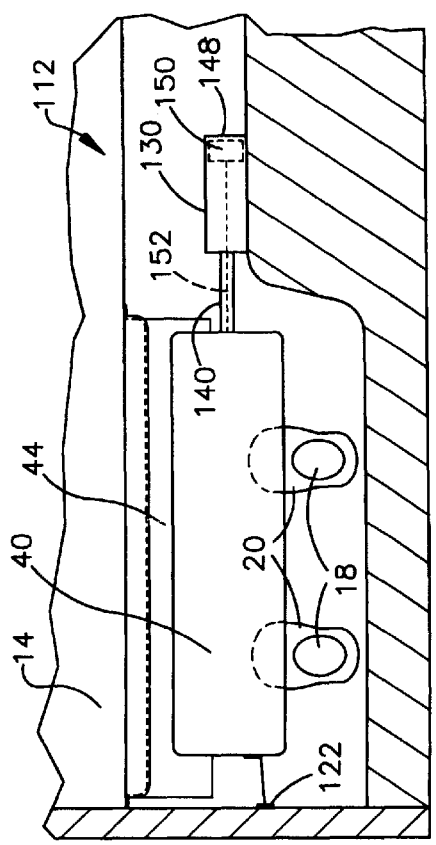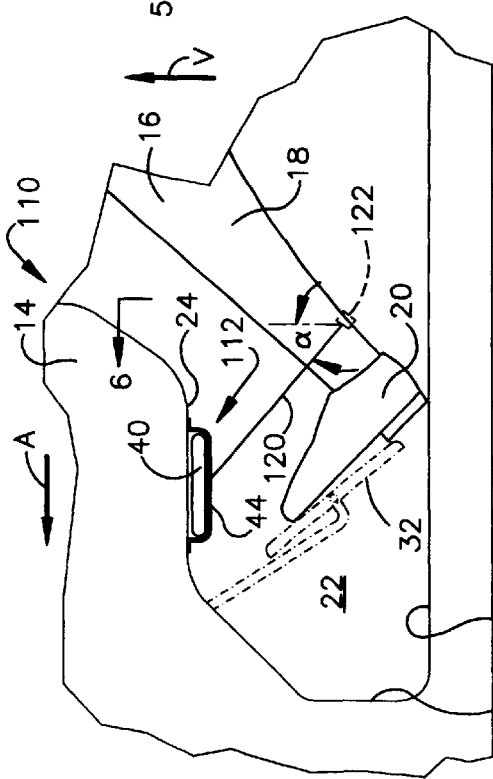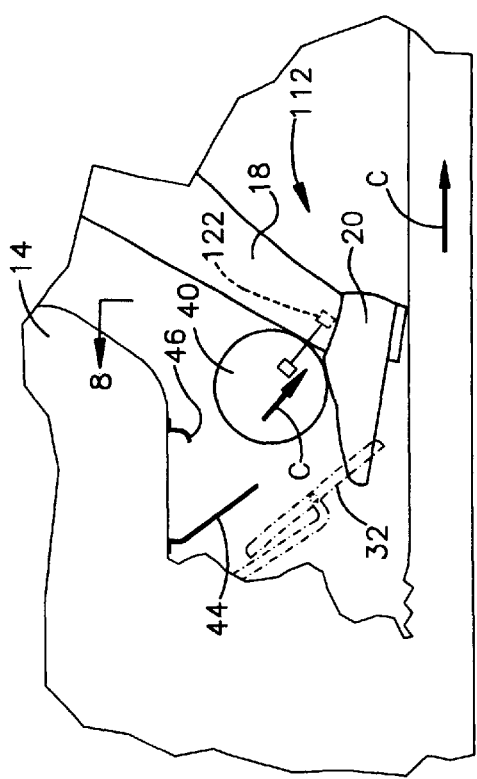

VEHICLE OCCUPANT LOWER EXTREMITY PROTECTION APPARATUS

TECHNICAL FIELD

The present invention relates to an apparatus for helping to protect a vehicle occupant, and is particularly directed to an apparatus for helping to protect the lower extremities of a vehicle occupant in the event of a vehicle collision.

BACKGROUND OF THE INVENTION

It is known to help protect a vehicle occupant from injury during a vehicle collision with an inflatable occupant restraint such as an air bag. Air bags are known to deploy into the passenger compartment of the vehicle from a variety of vehicle locations including the steering wheel, the instrument panel, the side doors, and the headliner, to help restrain movement of the vehicle occupant's head and torso. It is also known to position an inflatable restraint in the area of the knee bolster in the vehicle to help protect the knees of the vehicle occupant during a collision.

A vehicle collision, particularly a severe frontal collision, can result in deformed portions of the vehicle body penetrating the footwell of the vehicle where the occupant's feet are located. Accordingly, an apparatus which moves the occupant's feet rearward in the footwell away from the penetrating vehicle body portions would help to protect the feet from injury during such a collision.

SUMMARY OF THE INVENTION

The present invention is an apparatus for helping to protect an occupant of a vehicle. The apparatus comprises an inflatable device having a stored deflated position in which the inflatable device is located adjacent an instrument panel in the vehicle, and an inflator for providing inflation fluid for inflating the inflatable device. The inflatable device, when inflated, engages at least one lower extremity of the occupant. An actuator moves the inflatable device rearwardly in the vehicle to move a foot associated with the at least one lower extremity of the occupant rearwardly in the vehicle.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 1 is a schematic side view of a portion of a vehicle having an apparatus for helping to protect a vehicle occupant constructed in accordance with a first embodiment of the present invention, the apparatus being shown in a stored condition;

FIG. 2 is a view taken along line 2—2 in FIG. 1;

FIG. 3 is a view similar to FIG. 1 showing the apparatus in a deployed condition;

FIG. 4 is a view taken along line 4—4 in FIG. 3;

FIG. 5 is a schematic side view of a portion of a vehicle having an apparatus for helping to protect a vehicle occupant constructed in accordance with a second embodiment of the present invention, the apparatus being shown in a stored condition;

FIG. 6 is a view taken along line 6—6 in FIG. 5;

FIG. 7 is a view similar to FIG. 5 showing the apparatus in a deployed condition; and FIG. 8 is a view taken along line 8—8 in FIG. 7.

DESCRIPTION OF PREFERRED EMBODIMENTS

The present invention relates to an apparatus for helping to protect a vehicle occupant, and is particularly directed to an apparatus for helping to protect the lower extremities of a vehicle occupant in the event of a vehicle collision. As representative of the present invention, FIG. 1 illustrates a portion of a vehicle 10 having an apparatus 12 for helping to protect a vehicle occupant. The vehicle 10 has a forward direction of travel indicated by arrow A and includes an instrument panel 14 extending in a transverse direction B (FIG. 2). The vehicle 10 includes a vehicle seat (not shown) in which a vehicle driver 16 (FIG. 1), having lower legs 18 and feet 20, is seated.

The vehicle 10 further includes a footwell 22 into which the lower legs 18 and the feet 20 of the vehicle driver 16 extend. The footwell 22 of the vehicle 10 has a width W (FIG. 2) and is generally defined by a plurality of surfaces in the vehicle including an upper surface 24 (FIG. 1), a toe board surface 26, a lower surface 28, and a side surface 30 (FIG. 2) which forms a portion of the vehicle's A-pillar (not shown). The upper surface 24 extends underneath the instrument panel 14. A plurality of pedals 32, only one of which is shown in dashed lines in FIG. 1, are located in the footwell 22 and are engagable by the feet 20 of the driver 16 to control a vehicle operation as is known in the art.

The apparatus 12 comprises an inflatable tube 40, an inflator 70, and an actuator 80. The inflatable tube 40 may be made from any of the known materials used for inflatable air bags. The inflatable tube 40 has a longitudinal axis extending in the transverse direction B and a length L which is slightly less than the width W of the footwell 22. The inflatable tube 40 is stored in a deflated condition within a protective cover 44. The cover 44 is preferable a section of vehicle trim secured to the upper surface 24 underneath the instrument panel 14. The cover includes a predefined tear seam 46 (FIG. 3).

First and second cables 48 and 50 are attached to opposite ends 52 and 54, respectively, of the inflatable tube 40. The cables 48, 50 extend through the cover 44 and project downwardly at an angle α, which is preferably approximately 45°, from a vertical direction indicated by arrow V. Each of the cables 48, 50 wraps around a pulley 56 attached to the lower surface 28 and connects to the actuator 80 which is also attached to the lower surface. It should be understood that the cables 48, 50 could alternatively connect to separate but identical actuators 80. First and second tether straps 58 and 60 (FIG. 4) are attached to the ends 52 and 54, respectively, of the inflatable tube 40 and connect the inflatable tube with the instrument panel 14.

The actuator 80 is similar to known devices which are used to pretension seat belt webbing in the event of a vehicle collision. A body of pyrotechnic material (not shown) in the actuator 80 is ignitable to generate a force which acts on a movable piston 82 inside the actuator. The cables 48, 50 are attached to the piston 82 and are pulled by the piston when the piston moves. The body of pyrotechnic material in the actuator 80 is operatively coupled with one or more collision sensors (not shown) in the vehicle 10 and is ignited under conditions indicative of an impending frontal impact collision of a severe magnitude.

A flexible conduit 66 (FIG. 2) extends from one end 54 of the inflatable tube 40 toward the center of the vehicle 10. The flexible conduit 66 is preferably made from a fabric, such as the fabric used for inflatable air bags. The flexible conduit 66 fluidly connects the inflatable tube 40 with the inflator 70. The inflator 70 is secured in the middle of the vehicle 10 under the instrument panel 14. The inflator 70 is operatively coupled with the collision sensor(s) in the vehicle 10 and, in the event of a severe frontal impact collision, is operable to provide inflation fluid to the inflatable tube 40 via the flexible conduit 66. The inflator 70 may be selected from any of the known inflator constructions, including heated gas inflators, stored gas inflators, hybrid or augment inflators, or gas generating inflators.

FIG. 1 and 2 illustrate the position of the inflatable tube 40 enclosed by the protective cover 44 during normal vehicle operation. The approximate position of the vehicle driver's feet 20 in the footwell 22 during normal operation is also shown in FIG. 1. Upon the occurrence of vehicle conditions indicative 'of an impending severe frontal collision, one or more of the collision sensors either completes an electrical circuit or sends a signal to a controller to cause thee body of pyrotechnic material in the actuator 80 to ignite. Simultaneously, the collision sensor or sensors either complete an electrical circuit or sends a signal to a controller to cause the inflator 70 to inflate the inflatable tube 40. As the inflatable tube 40 inflates, the inflatable tube breaks through the tear seam 46 in the cover 44 and expands to the tubular shape shown in FIG. 3 in the footwell 22.

At the same time, the ignition of the body of pyrotechnic material in the actuator 80 creates a force which acts on the piston 82 and forces the piston to move to the fright (as viewed in FIGS. 2 and 4). As the piston 82 moves to the right, the ends of the cables 48, 150 attached to the piston 82 are also pulled to the right. The movement of the cables 48, 50 pulls the now-inflated inflatable tube 40 downward and to the right (rearwardly in the vehicle) as shown by arrow C in FIG. 3, land into engagement with the lower legs 18 of the vehicle driver 16. As the cables 48, 50 continue to pull on the inflatable tube 40, the lower legs 18 and feet 20 of the vehicle driver 16 are moved rearwardly in the footwell 22 of the vehicle 10. This rearward movement of the lower legs 18 and feet 20 helps to protect the driver's feet from injury caused by deformed vehicle body portions (not shown) which could penetrate into the footwell 22 during the collision. In addition, the inflatable tube 40 absorbs the energy of the lower legs 18 tending to move the lower legs in the forward direction and cushions against such forward movement. The rearward movement of the inflatable tube 40, and hence the driver's lower legs 18 and feet 20, is limited by the tether straps 58, 60 extending between the inflatable tube 40 and the instrument panel 14.

FIGS. 5–8 illustrate an apparatus 112 constructed in accordance with a second embodiment of the present invention. In the second embodiment, parts of the apparatus 112 which are identical to parts of the apparatus 12 shown in the first embodiment have identical reference numerals.

The inflatable tube 40 has a deflated stored position in which the inflatable tube is enclosed behind the protective cover 44 underneath the instrument panel 14. A tether 120 extends from one end 52 of the inflatable tube 40 to an attachment point 122 on the side surface 30 of the vehicle 110. The attachment point 122 is located beneath and rearward of the inflatable tube 40 such that the tether 120 extends at the angle α, which is preferably approximately 45°, from the vertical direction V.

An inflator 130 is secured in the middle of the vehicle 110 adjacent the instrument panel 14. The inflator 130 is located approximately directly across the footwell 22 from the attachment point 122 of the tether 120. Thus, the inflator 130 lies at the angle a from the inflatable tube 40 in its stored position. The inflator 130 is operatively coupled with a collision sensor (not shown) in the vehicle and, in the event of a severe frontal impact collision, is operable to provide inflation fluid for inflating the inflatable tube 40. A flexible conduit 140 fluidly connects the inflator 130 and the inflatable tube 40. The flexible conduit 140 is preferably made from a fabric, such as the fabric used for inflatable air bags.

An actuator is associated with the inflator 130 and comprises device 148 a movable piston 150 and a body of pyrotechnic material (not shown). The piston 150 is connected to the inflatable tube 40 by a cable 152 which extends through the flexible conduit 140.

FIGS. 5 and 6 illustrate the position of the inflatable tube 40 enclosed by the protective cover 44 during norm al vehicle operation. The approximate position of the vehicle driver's feet 20 in the footwell 221 during normal operation is also shown in FIG. 5. Upon the occurrence of vehicle conditions indicative of an impending severe frontal collision, the collision sensor either completes an electrical circuit or sends a signal to a controller to cause the body of pyrotechnic material in the inflator 130 to ignite and to cause the inflator to begin inflating the inflatable tube 40. As the inflatable tube 40 inflates, the inflatable tube breaks through the tear seam 46 in the cover 44 and expands to the tubular shape shown in FIG. 7 in the footwell 22.

Simultaneously, the ignition of the body of pyrotechnic material in the actuator device 148 of the inflator 130 creates a force acting on the piston 150 and forces the piston in the direction of arrow B. As the piston 150 moves in the direction of arrow B, the cable 152 attached to the piston 152 is also pulled. The movement of the cable 152 pulls the now-inflated inflatable tube 40 downward and rearwardly in the vehicle as shown by arrow C in FIG. 7, and into engagement with the lower legs 18 of the vehicle driver 16. As the cable 152 continues to pull downwardly and rearwardly on the inflatable tube 40, the lower legs 18 and feet 20 of the vehicle driver 16 are moved rearwardly in the footwell 22 of the vehicle 10. This rearward movement of the lower legs 18 and feet 20 helps to protect the driver's feet from injury caused by deformed vehicle body portions (not shown) which could penetrate into the footwell 22 during the collision.

From the above description of the invention, those skilled in the art will perceive improvements, changes and modifications. For example, it should be understood that the apparatuses disclosed above could be used on either the driver's side or the passenger's side of a vehicle, or both sides. Further, the centrally located components of the apparatuses, such as the inflator, could be used to simultaneously inflate inflatable tubes on both the driver's side and the passenger's side. Such improvements, changes and modifications within the skill of the art are intended to be covered by the appended claims.

Having described the invention, I claim:

1. Apparatus for helping to protect an occupant of a vehicle, said apparatus comprising:

an inflatable device having a stored deflated position in which said inflatable device is located adjacent an instrument panel in the vehicle;

means for providing inflation fluid for inflating said inflatable device, said inflatable device, while inflated, being adapted to engage at least one lower extremity of the occupant; and means for moving said inflatable device, while inflated, rearwardly in the vehicle, said inflatable device being adapted to engage a foot associated with said at least one lower extremity of the occupant for rearward movement in the vehicle.

2. Apparatus as defined in claim 1, wherein said means for providing inflation fluid comprises an inflator and said means for moving said inflatable device comprises an actuator.

3. Apparatus as defined in claim 2 wherein said inflatable device comprises a tube having a longitudinal axis extending transverse to a forward direction of travel of the vehicle said tube having a length such that said tube, while inflated, engages both lower extremities of the occupant, both feet of the occupant being moved rearwardly in the vehicle when said actuator moves said inflated inflatable device rearwardly in the vehicle.

4. Apparatus as defined in claim 2 further including a tether attached to said inflatable device and to the instrument panel for limiting the movement of said inflatable device away from the instrument panel.

5. Apparatus as defined in claim 2 wherein said apparatus further comprises a member movable upon actuation of said actuator and a part connecting said member to said inflatable device.

6. Apparatus as defined in claim 5 wherein said member comprises a piston movable upon ignition of said inflatable material and said part comprises a cable connecting said piston to said inflatable device.

7. Apparatus as defined in claim 1 wherein said means for providing inflation fluid comprises an inflator and said means for moving said inflatable device comprises a piston movable in a cylinder when said inflator providers said inflation fluid, said apparatus further including a member attached to said piston and to said inflatable device, said piston pulling said member when said inflation fluid is provided to move said inflatable device rearwardly in the vehicle.

8. Apparatus as defined in claim 5, wherein said actuator is adapted to pull the inflated inflatable device rearwardly in the vehicle to move said inflatable device rearwardly in the vehicle.

9. Apparatus as defined in claim 7, wherein said member comprises an inflation fluid conduit and a cable extending through said inflation fluid conduit, said inflation fluid conduit directing inflation fluid produced by ignition of said body of pyrotechnic material into said inflatable device to inflate said inflatable device.

10. Apparatus as defined in claim 9 wherein said inflatable device, when inflated, is a tube having a longitudinal axis extending transverse to a forward direction of travel of the vehicle, said inflation fluid conduit and said cable being attached to one end of said tube and the other end of said tube being attached to a side surface of the vehicle.

11. Apparatus as defined in claim 10 wherein said piston moves in a direction transverse to the forward direction of travel of the vehicle.

12. Apparatus as defined in claim 10, wherein said side surface forms a portion of an A-pillar of the vehicle.

13. Apparatus as defined in claim 10, wherein said piston pulls on said cable to move said inflated inflatable device downwardly and rearwardly in the vehicle to move at least one foot of the occupant rearwardly in the vehicle.

14. Apparatus for helping to protect an occupant of a vehicle, said apparatus comprising:

an inflatable device having a stored deflated position in which said inflatable device is located adjacent an instrument panel in the vehicle, said inflatable device, while inflated, being adapted to engage at least one lower extremity of the occupant;

an inflator actuatable to provide inflation fluid for inflating said inflatable device; and an actuator associated with said inflator, said actuator including a piston movable in a cylinder and a cable attached to said piston and to said inflatable device, said actuator being actuated when said inflator is actuated to inflate said inflatable device, said piston pulling on said cable to pull said inflated inflatable device rearwardly in the vehicle to move said inflated inflatable device rearward in the vehicle, said inflatable device being adapted to engage at least one foot of the occupant for rearward movement in the vehicle.

15. Apparatus for helping to protect an occupant of a vehicle, said apparatus comprising:

an inflatable device having a stored deflated position in which said inflatable device is located adjacent an instrument panel in the vehicle, said inflatable device, while inflated, being adapted to engage at least one lower extremity of the occupant;

an inflator actuatable to provide fluid;

an actuator associated with said inflator, said actuator including a piston movable in a cylinder;

an inflation fluid conduit for directing inflation fluid from said inflator into said inflatable device to inflate said inflatable device; and a cable connected to said piston and said inflatable device and extending through said inflation fluid conduit, said inflator, when actuated, providing fluid that is directed through said inflation fluid conduit to inflate said inflatable device and providing fluid that creates a force for moving said piston in said cylinder, said piston pulling said cable to pull said inflatable device, while inflated, rearwardly in the vehicle to engage at least one foot of the occupant to move the at least one foot rearwardly in the vehicle.

16. Apparatus for helping to protect an occupant of a vehicle, said apparatus comprising:

an inflatable device having a stored deflated position in which said inflatable device is located adjacent an instrument panel in the vehicle;

an inflator for providing inflation fluid for inflating said inflatable device; and an actuator for moving said inflatable device, while inflated, rearwardly in the vehicle, said inflatable device comprising a tube having a longitudinal axis extending transverse to a forward direction of travel of the vehicle, said tube having a length such that said tube engages both lower extremities of the occupant while inflated and moves both feet of the occupant rearwardly in the vehicle when said actuator moves said inflated inflatable device rearwardly in the vehicle.

17. Apparatus for helping to protect an occupant of a vehicle, said apparatus comprising:

an inflatable device having a stored deflated position in which said inflatable device is located adjacent an instrument panel in the vehicle, said inflatable device, while inflated, being adapted to engage at least one lower extremity of the occupant; and an inflator for providing inflation fluid for inflating said inflatable device, said inflator including a piston movable in a cylinder when said inflation fluid is provided; and a member attached to said piston and to said inflatable device, said member directing said inflation fluid into said inflatable device to inflate said inflatable device and pulling on said inflatable device to move said inflatable device rearwardly in the vehicle when said piston moves in said cylinder, said inflatable device being adapted to engage at least one foot of the occupant to move the at least one foot rearwardly in the vehicle when said piston pulls said inflatable device rearwardly in the vehicle.

18. Apparatus for helping to protect an occupant of a vehicle, said apparatus comprising:
an inflatable device having a stored deflated position in which said inflatable device is located adjacent an instrument panel in the vehicle;
an inflator for providing inflation fluid for inflating said inflatable device, said inflatable device, while inflated, engaged at least one lower extremity of the occupant; and
an actuator for moving said inflatable device, while inflated, rearwardly in the vehicle to move a foot associated with said at least one lower extremity of the occupant rearwardly in the vehicle.

19. Apparatus as defined in claim 18 wherein said inflatable device comprises a tube having a longitudinal axis extending transverse to a forward direction of travel of the vehicle, said tube having a length such that said tube, while inflated, engages both lower extremities of the occupant, both feet of the occupant being moved rearwardly in the vehicle when said inflated inflatable device moves rearwardly in the vehicle.

20. Apparatus as defined in claim 18 further including a tether attached to said inflatable device and to the instrument panel for limiting the movement of said inflatable device away from the instrument panel.

21. Apparatus as defined in claim 18 wherein said actuator comprises a member movable upon actuation of said actuator and a part connecting said member to said inflatable device.

22. Apparatus as defined in claim 21 wherein said member comprises a piston moveable upon actuation of said actuator and said part comprises a cable connecting said piston to said inflatable device.

23. Apparatus as defined in claim 21 wherein said actuator further comprises a body of pyrotechnic material ignitable upon actuation of said actuator to move said member.

24. Apparatus as defined in claim 18, wherein said actuator is adapted to pull the inflated inflatable device rearwardly in the vehicle to move said inflatable device rearwardly in the vehicle.

25. Apparatus as defined in claim 18 wherein said actuator comprises a piston movable in a cylinder, said inflator providing fluid for moving said piston in said cylinder when said inflator provides said inflation fluid, said apparatus further including a member attached to said piston and to said inflatable device, said piston pulling said member when said piston moves in said cylinder to move said inflatable device rearwardly in the vehicle.

26. Apparatus as defined in claim 25, wherein said member comprises an inflation fluid conduit and a cable extending through said inflation fluid conduit, said inflation fluid conduit directing inflation fluid provided by said inflator into said inflatable device to inflate said inflatable device.

27. Apparatus as defined in claim 26 wherein said inflatable device, when inflated, is a tube having a longitudinal axis extending transverse to a forward direction of travel of the vehicle, said inflation fluid conduit and said cable being attached to one end of said tube and the other end of said tube being attached to a side surface of the vehicle.

28. Apparatus as defined in claim 27, wherein said side surface forms a portion of an A-pillar of the vehicle.

29. Apparatus as defined in lcaim 26, wherein said piston pulls on said cable to move said inflated inflatable device downwardly and rearwardly in the vehicle to move at least one foot of the occupant rearwardly in the vehicle.

30. Apparatus as defined in claim 25 wherein said piston moves in a direction transverse to the forward direction of travel of the vehicle.

31. Apparatus for helping to protect an occupant of a vehicle, said apparatus comprising:
an inflatable device having a stored deflected position in which said inflatable device is located adjacent an instrument panel in the vehicle, said inflatable device, while inflated, engaging at least one lower extremity of the occupant;
an inflator actuatable to provide inflation fluid for inflating said inflatable device; and
an actuator associated with said inflator, said actuator including a piston movable in a cylinder and a cable attached to said piston and to said inflatable device,
said actuator being actuated when said inflator is actuated to inflate said inflatable device, said piston pulling on said cable to pull said inflated inflatable device reawardly in the vehicle to move said inflated inflatable device and at least one foot of the occupant rearwardly in the vehicle.

32. Apparatus for helping to protect an occupant of a vehicle, said apparatus comprising:
an inflatable device having a stored deflated position in which said inflatable device is located adjacent an instrument panel in the vehicle, said inflatable device, while inflated, engaging at least one lower extremity of the occupant;
an inflator actuable to provide fluid;
an actuator associated with said inflator, said actuator including a piston movable in a cylinder;
an inflation fluid conduit for directing fluid from said inflator into said inflatable device to inflate said inflatable device; and
a cable connected to said piston and said inflatable device and extending through said inflation fluid conduit;
said inflator, when actuated, providing fluid that is directed through said inflation fluid conduit to inflate said inflatable device and providing fluid that creates a force for moving said piston in said cylinder, said piston pulling said cable to pull said inflatable device, while inflated, rearwardly in the vehicle to move at least one foot of the occupant rearwardly in the vehicle.

33. Apparatus for helping to protect an occupant of a vehicle, said apparatus comprising:
an inflatable device having a stored deflated position in which said inflatable device is located adjacent an instrument panel in the vehicle;
an inflator for providing inflation fluid for inflating said inflatable device; and
an actuator for moving said inflatable device, while inflated, rearwardly in the vehicle;
said inflatable device comprising a tube having a longitudinal axis extending transverse to a forward direction of travel of a vehicle, said tube having a length such that said tube engages both lower extremities of the occpant while inflated and moves both feet of the occupant rearwardly in the vehicle when said actuator moves said inflated inflatable device rearwardly in the vehicle.

34. Apparatus for helping to protect an occupant of a vehicle, said apparatus comprising:

an inflatable device having a stored deflated position in which said inflatable device is located adjacent an instrument panel in the vehicle, said inflatable device, while inflated, engaging at least one lower extremity of the occupant;

an inflator for providing inflation fluid for inflating said inflatable device, said inflator including a piston movable in a cylinder when said inflation fluid is provided; and a member attached to said piston and to said inflatable device, said member directing said inflation fluid into said inflatable device to inflate said inflatable device and pulling on said inflatable device to move said inflatable device rearwardly in the vehicle when said piston moves in said cylinder, said inflatable device moving at least one foot of the occupant rearwardly in the vehicle when said piston pulls said inflatable device rearwardly in the vehicle.

* * * * *

UNITED STATES PATENT AND TRADEMARK OFFICE
CERTIFICATE OF CORRECTION

PATENT NO. : 6,464,246 B2  
DATED : October 15, 2002  
INVENTOR(S) : Gregory S. Bayley It is certified that error appears in the above-identified patent and that said Letters Patent is hereby corrected as shown below:

Column 5,  
Line 24, delete "ignition" and insert -- actuation --.  
Line 24, delete "inflatable material" and insert -- actuator --.  
Line 30, delete "providers" and insert -- provides --.

Column 8,  
Line 3, delete "lcaim" and insert -- claim --.  
Line 12, delete "deflected" and insert -- deflated --.

Signed and Sealed this

Eleventh Day of November, 2003

JAMES E. ROGAN  
*Director of the United States Patent and Trademark Office*